(12) United States Patent
Hayhow et al.

(10) Patent No.: US 12,062,044 B2
(45) Date of Patent: Aug. 13, 2024

(54) SYSTEM AND METHOD FOR AUTHORIZING A FINANCIAL TRANSACTION (71) Applicant: THE TORONTO-DOMINION BANK, Toronto (CA)

(72) Inventors: Robert Hayhow, Burlington (CA); Igor Elkhinovich, Thornhill (CA); Jeffrey Aaron Ecker, North York (CA)

(73) Assignee: The Toronto-Dominion Bank, Toronto (CA)

( * ) Notice: Subject to any disclaimer, the term of this patent is extended or adjusted under 35 U.S.C. 154(b) by 200 days.

(21) Appl. No.: 17/376,031

(22) Filed: Jul. 14, 2021

(65) Prior Publication Data

US 2021/0342835 A1    Nov. 4, 2021

Related U.S. Application Data (63) Continuation of application No. 14/464,632, filed on Aug. 20, 2014, now abandoned.

(Continued)

(51) Int. Cl.
   G06Q 20/40 (2012.01)
   G06Q 20/34 (2012.01)
   G06Q 20/38 (2012.01)

(52) U.S. Cl.
   CPC ....... *G06Q 20/4012* (2013.01); *G06Q 20/341* (2013.01); *G06Q 20/3821* (2013.01);
   (Continued)

(58) Field of Classification Search
   CPC .................. G06Q 30/0229; G06Q 20/341
   (Continued)

(56) References Cited

U.S. PATENT DOCUMENTS 5,945,653 A * 8/1999 Walker ................. G06Q 20/357
                                                          235/383
6,842,743 B2    1/2005 Yu et al.
(Continued)

FOREIGN PATENT DOCUMENTS

CA    2771395 A1    5/2013
CA    2834272 A1    2/2014
(Continued)

OTHER PUBLICATIONS

EMV, "Integrated Circuit Card Specifications for Payment Systems,"-v. 4.1, Book 3 (Year: 2004).*

(Continued)

*Primary Examiner* — Jacob C. Coppola
*Assistant Examiner* — Eduardo Castilho
(74) *Attorney, Agent, or Firm* — Duane Morris LLP (57) ABSTRACT

A payment terminal includes a card interface and a transaction processor. The terminal receives a preliminary authorization amount, and receives application data from a payment card that is interfaced with the card interface. The application data includes an account number that is uniquely associated with the payment card. The processor generates an adjusted authorization amount from the account number and the preliminary authorization amount, determines whether the adjusted authorization amount can be authorized offline, and transmits a cryptogram request to the payment card. The adjusted authorization amount is different from the preliminary authorization amount. The cryptogram request includes the adjusted authorization amount. The processor receives a cryptogram from the payment card, receives an authorization response message confirming authorization of the adjusted authorization amount, and confirms that the cryptogram was generated from the adjusted authorization (Continued)

amount and from a cryptographic key that is uniquely associated with the payment card.

20 Claims, 4 Drawing Sheets

Related U.S. Application Data (60) Provisional application No. 61/875,919, filed on Sep. 10, 2013.

(52) U.S. Cl.
CPC ..... *G06Q 20/3823* (2013.01); *G06Q 20/3829* (2013.01); *G06Q 2220/00* (2013.01)

(58) Field of Classification Search
USPC .......................................................... 705/71
See application file for complete search history.

(56) References Cited

U.S. PATENT DOCUMENTS

| | | |
|---|---|---|
| 7,024,395 B1 | 4/2006 | McCown et al. |
| 7,103,575 B1 | 9/2006 | Linehan |
| 8,266,031 B2 | 9/2012 | Norris et al. |
| 8,484,134 B2 | 7/2013 | Hobson et al. |
| 8,572,394 B2 | 10/2013 | Hird et al. |
| 8,635,157 B2 | 1/2014 | Smith et al. |
| 9,530,131 B2 * | 12/2016 | Patterson ............ G06Q 20/401 |
| 9,704,161 B1 * | 7/2017 | Oates .................... G06Q 20/00 |
| 2002/0062249 A1 * | 5/2002 | Iannacci .............. G06Q 20/105 705/14.1 |
| 2005/0033688 A1 * | 2/2005 | Peart ................... G06Q 20/352 340/5.4 |
| 2006/0011719 A1 * | 1/2006 | Lehtonen ............ G06Q 20/387 705/14.27 |
| 2006/0059040 A1 | 3/2006 | Eldred et al. |
| 2006/0161490 A1 * | 7/2006 | Chakiris .............. G06Q 20/204 705/35 |
| 2006/0293952 A1 * | 12/2006 | Nicholson .......... G06Q 30/0219 705/14.36 |
| 2007/0106602 A1 | 5/2007 | Wolters |
| 2007/0118483 A1 * | 5/2007 | Hill ........................ G06Q 20/40 705/64 |
| 2007/0168260 A1 * | 7/2007 | Cunescu ............. G06Q 20/3552 705/26.1 |
| 2007/0215697 A1 * | 9/2007 | Ward ................... G06Q 20/105 235/380 |
| 2008/0040285 A1 | 2/2008 | Wankmueller |
| 2008/0059303 A1 * | 3/2008 | Fordyce ............. G06Q 30/0223 705/14.27 |
| 2008/0133351 A1 | 6/2008 | White et al. |
| 2008/0189183 A1 | 8/2008 | Nicholson |
| 2008/0208759 A1 | 8/2008 | Royyuru |
| 2008/0257958 A1 * | 10/2008 | Rothwell ............... G06Q 20/34 235/449 |
| 2009/0070171 A1 | 3/2009 | Patterson |
| 2009/0210299 A1 * | 8/2009 | Cowen ................. G06Q 20/204 705/13 |
| 2009/0281871 A1 * | 11/2009 | Tietzen .................. G06Q 20/12 705/14.3 |
| 2009/0313132 A1 | 12/2009 | McKenna |
| 2010/0038421 A1 | 2/2010 | Baker et al. |
| 2010/0057580 A1 * | 3/2010 | Raghunathan ..... G06Q 20/3572 705/17 |
| 2010/0106570 A1 * | 4/2010 | Radu .................. G06Q 30/0229 705/14.3 |
| 2010/0274722 A1 * | 10/2010 | Roberts ................. G06Q 20/38 705/44 |
| 2011/0057027 A1 * | 3/2011 | Grossman .......... G06Q 30/0226 705/14.27 |
| 2011/0244799 A1 | 10/2011 | Roberts et al. |
| 2011/0276420 A1 | 11/2011 | White et al. |
| 2012/0011070 A1 | 1/2012 | Ward et al. |
| 2012/0016728 A1 * | 1/2012 | Ahmad .................. G06Q 20/10 707/769 |
| 2012/0197708 A1 | 8/2012 | Mullen et al. |
| 2012/0215605 A1 * | 8/2012 | Gardner ................ G06Q 20/36 705/41 |
| 2012/0317035 A1 | 12/2012 | Royyuru et al. |
| 2012/0323667 A1 | 12/2012 | Groff et al. |
| 2013/0054474 A1 | 2/2013 | Yeager |
| 2013/0085835 A1 | 4/2013 | Horowitz |
| 2013/0103487 A1 * | 4/2013 | Nordstrand .......... G06Q 20/387 705/14.38 |
| 2013/0124287 A1 | 5/2013 | Bjorn et al. |
| 2013/0132282 A1 | 5/2013 | Shakkarwar |
| 2013/0132283 A1 | 5/2013 | Hayhow et al. |
| 2013/0185167 A1 | 7/2013 | Mestre et al. |
| 2013/0211929 A1 * | 8/2013 | Itwaru .................. G06Q 20/325 705/16 |
| 2013/0238408 A1 | 9/2013 | Cooke et al. |
| 2014/0039990 A1 | 2/2014 | Georgi |
| 2014/0074568 A1 | 3/2014 | Mosoe |
| 2014/0074724 A1 | 3/2014 | Gordon et al. |
| 2014/0108263 A1 | 4/2014 | Ortiz |
| 2014/0236842 A1 * | 8/2014 | Salminen ............. G06Q 20/401 705/18 |
| 2017/0330217 A1 * | 11/2017 | Postrel ............... G06Q 30/0226 |

FOREIGN PATENT DOCUMENTS

| | | | |
|---|---|---|---|
| WO | WO-2005029284 A2 * | 3/2005 | ............. G06Q 30/02 |
| WO | 2005086593 A3 | 7/2006 | |
| WO | 2007113669 A1 | 10/2007 | |
| WO | WO-2013090772 A1 * | 6/2013 | ............. G06Q 20/12 |
| WO | 2014009646 A1 | 1/2014 | |
| WO | 2014029620 A1 | 2/2014 | |

OTHER PUBLICATIONS

O. Ogundele, P. Zavarsky, R. Ruhl and D. Lindskog, "The Implementation of a Full EMV Smartcard for a Point-of-Sale Transaction and Its Impact on the PCI DSS," 2012 International Conference on Privacy, Security, Risk and Trust, Netherlands, 2012, pp. 797-806, doi: 10.1109/SocialCom-PASSAT.2012.80. (Year: 2012).*
Radu, Cristian. Implementing Electronic Card Payment Systems. Artech House, 2002. ProQuest Ebook Central, http://ebookcentral.proquest.com/lib/USPTO-ebooks/detail.action?docID=227605. (Year: 2002).*
Hassinen, M., Utilizing national public-key infrastructure in mobile payment systems, Electronic Commerce Research and Applications 7, 2008, pp. 214-231, Found via IEEE, Downloaded via URL: http://pkimobile.googlecode.com/svn/trunk/Documents/Utilizing%20national%20public-key%20infrastructure%20in%20mobile%20payment%20systems.pdf.
Gauthier, V., Offline NFC Payments with Electronic Vouchers, MobiHeld'09, Aug. 17, 2009, Found via Google Scholar, Downloaded via : http://ece.WPI.edu/-dchasaki/papers/offline_payments.pdf.
M'Rahi, D., E-commerce Applications of Smart Cards, Computer Networks 36(4), pp. 435-472, Found via Google Scholar, Downloaded via URL: hllp://pdf.aminer.org/000/794/771/e_commerce_applications_of_smart_cards.pdf.
EMV—Integrated Circuit Card Specifications for Payment Systems—v.4.1 Book 3, May 2004, p. 94; (2004).
Cristian Radu; Implementing Electronic Card Payment Systems; Artech House, 2003; ISBN 1580538037, 9781580538039; p. 267.

* cited by examiner

SYSTEM AND METHOD FOR AUTHORIZING A FINANCIAL TRANSACTION

CROSS-REFERENCE TO RELATED APPLICATIONS

This patent application is a continuation of U.S. patent application Ser. No. 14/464,632, filed Aug. 20, 2014, which claims the benefit of the filing date of U.S. Provisional Patent Application Ser. No. 61/875,919, filed Sep. 10, 2013, the contents of both of which are incorporated hereby by reference in their entirety.

FIELD

This patent application relates to a system and method for authorizing a financial transaction. In particular, this patent application describes a system and method for authorizing a financial transaction using a payment card.

BACKGROUND

A consumer might elect to use a payment terminal (e.g. point-of-sale (POS) terminal or pin-pad) and a magnetic-stripe payment card (e.g. credit card or debit card) to complete a financial transaction with a merchant (e.g. pay for a merchant's wares/services). After the consumer approves the authorization amount, the payment terminal prompts the consumer to interface a payment card with the payment terminal. The payment terminal acquires an account number from the payment card and forwards particulars of the financial transaction (e.g. authorization amount, and account number associated) to the merchant's acquirer for online authorization.

To encourage repeat business, a merchant might issue discount coupons to preferred consumers for redemption against the purchase price of the merchant's wares/services. This approach requires the particulars of each coupon to be input to the payment terminal and the payment terminal to recalculate the authorization amount, thereby lengthening the payment process. Alternately, the merchant might offer its own branded payment card (a loyalty card) that allows consumers to collect loyalty points which can be redeemed against the purchase price of the merchant's wares/services. With this latter approach, the account number is input to the payment terminal, and the payment terminal queries a remote database with the account number to determine the number of loyalty points available, and recalculates the authorization amount based on the number of loyalty points that the customer wishes to redeem, thereby again lengthening the payment process.

SUMMARY

This patent application discloses a payment terminal and associated method that dynamically alters the authorization amount of a financial transaction at the terminal based on the account number provided by a payment card.

In accordance with a first aspect of this disclosure, there is provided a payment terminal that includes a card interface, and a transaction processor that is coupled to the card interface. The transaction processor is configured to receive a preliminary authorization amount, and receive application data from a payment card that is interfaced with the card interface. The application data includes an account number that is uniquely associated with the payment card.

The transaction processor is configured to generate an adjusted authorization amount from the account number and the preliminary authorization amount, determine whether the adjusted authorization amount can be authorized offline, and transmit a cryptogram request to the payment card via the card interface. The adjusted authorization amount is different from the preliminary authorization amount. The cryptogram request includes the adjusted authorization amount.

The transaction processor is configured to receive a cryptogram from the payment card via the card interface, and receive an authorization response message confirming authorization of the adjusted authorization amount. The transaction processor is also configured to confirm that the cryptogram was generated from the adjusted authorization amount and from a cryptographic key that is uniquely associated with the payment card.

In accordance with a second aspect of this disclosure, there is provided a method of altering an authorization amount that involves a payment terminal receiving a preliminary authorization amount, and receiving application data from a payment card that is interfaced with the payment terminal.

The payment terminal generates an adjusted authorization amount from the account number and the preliminary authorization amount, determines whether the adjusted authorization amount can be authorized offline, and transmits a cryptogram request to the payment card, the cryptogram request including the adjusted authorization amount. The adjusted authorization amount is different from the preliminary authorization amount. The application data includes an account number that is uniquely associated with the payment card.

The payment generates a cryptogram, and transmits the cryptogram to the payment terminal. The payment terminal receives the cryptogram, and receives an authorization response message confirming authorization of the adjusted authorization amount. The payment terminal confirms that the cryptogram was generated from the adjusted authorization amount and from a cryptographic key that is uniquely associated with the payment card.

In one implementation, the payment terminal determines that the adjusted authorization amount can be authorized offline, and the transaction processor is configured to receive the cryptogram and the authorization response message from the payment card.

In one implementation, the payment terminal determines that the adjusted authorization amount cannot be authorized offline, and the transaction processor is configured to transmit an authorization request message to an issuer server and receive the authorization response message from the issuer server in response to the authorization request message. In one implementation, the payment terminal receives confirmation from the payment card that the adjusted authorization amount cannot be authorized offline, and the transaction processor is configured to transmit an authorization request message to an issuer server, and receive the authorization response message from the issuer server in response to the authorization request message. In these latter two implementations, the authorization request message includes the cryptogram and the adjusted authorization amount.

In one implementation, the payment terminal is configured with a range of issuer identification numbers, and the transaction processor is configured to generate the adjusted authorization amount in accordance with a correlation between the account number and the range of issuer identification numbers. In one implementation, the transaction processor is configured to determine whether the adjusted authorization amount can be authorized offline by validating the payment card and a bearer of the payment card.

In one implementation, the transaction processor is configured to transmit a predetermined authorization amount to the payment card after receiving the preliminary authorization amount and prior to receiving the application data. In this implementation, the predetermined authorization amount is different from the preliminary authorization amount.

Since the payment terminal generates the adjusted authorization amount based on the account number associated with the payment card, and the payment card generates the cryptogram from the adjusted authorization amount, the vendor can offer preferred customers adjustments to the preliminary authorization amount without requiring re-configuration of the payment card or the card issuer server or re-introducing the payment card to the payment terminal.

BRIEF DESCRIPTION OF THE DRAWINGS

An exemplary payment authorization network, payment terminal, and method of altering an authorization amount will now be described, with reference to the accompanying drawings, in which.

DETAILED DESCRIPTION

Payment Authorization Network

Figure 1:
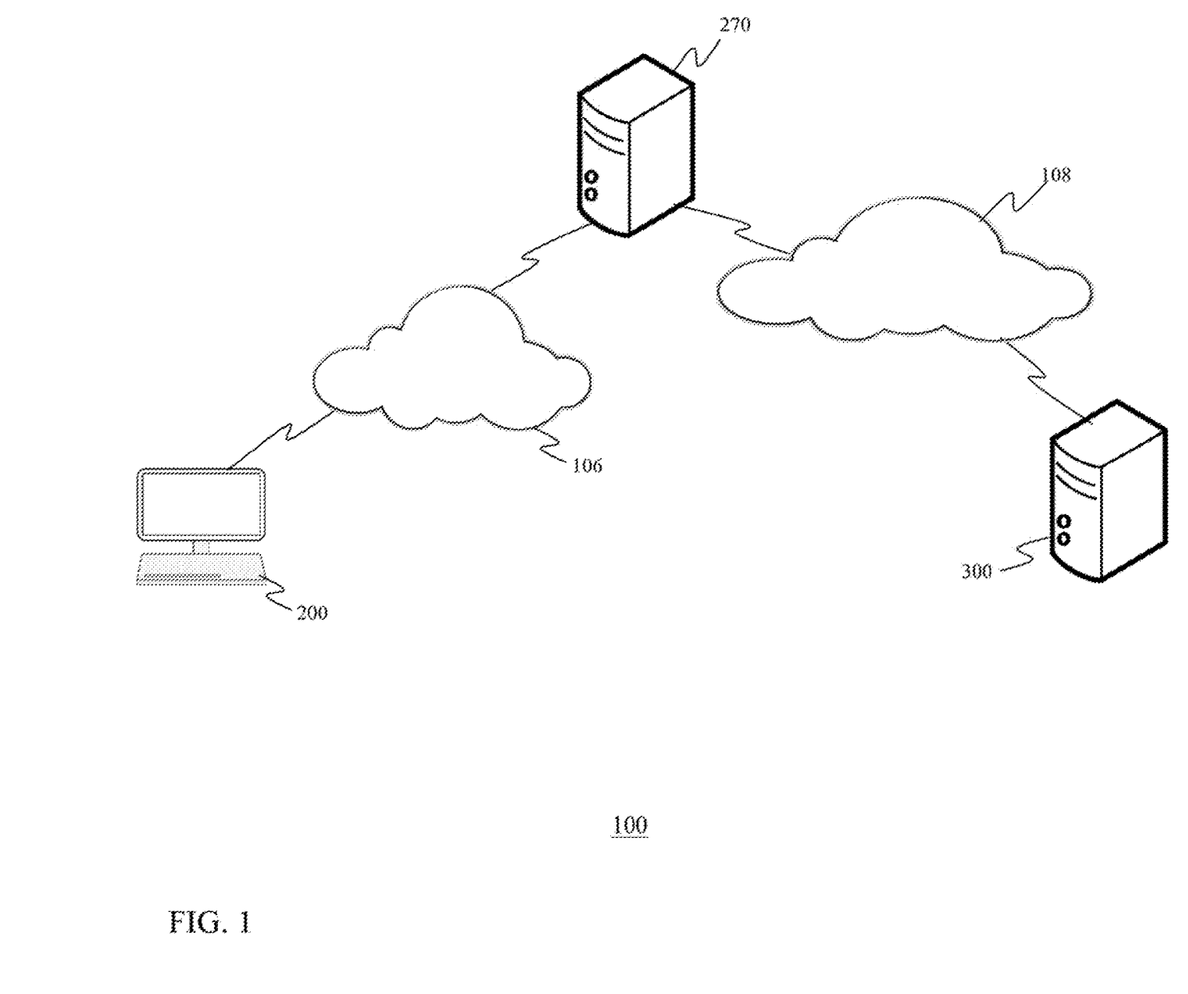
FIG. 1 is a schematic view of the payment authorization network, depicting a payment terminal, and an payment card issuer server.

FIG. 1 is a schematic view of the payment authorization network, denoted generally as 100. As shown, the payment authorization network 100 comprises a payment terminal 200, an acquirer server 270 and a payment card issuer server 300, and is configured to process financial transactions initiated by a payment cardholder at one of the payment terminals 200. As used herein, a "financial transaction" includes "online" transactions the particulars of which the merchant requests authorization in real-time, and "off-line" transactions the particulars of which the merchant requests authorization at a later time, such as the end of the business day.

The payment terminals 200 are typically deployed at a merchant's business premises, and are configured to communicate with a one of the acquirer servers 270 via a secure acquirer network 106. As non-limiting examples, one or more of the payment terminals 200 may be implemented as an integrated point-of-sale (POS) terminal, or a pin-pad terminal that communicates with respective electronic cash register (ECR).

Each acquirer server 270 is associated with a respective merchant, and is configured to communicate with the payment terminals 200 that are deployed at each merchant premises via each merchant's acquirer network 106. The acquirer servers 270 are also configured to communicate with the issuer server(s) 300 via a payment network 108, such as VisaNet or the Mastercard Network.

Each issuer server 300 is associated with and administered by a respective financial institution. The financial institution associated with the issuer server 300 issues payment cards to cardholders (or authorizes a third party to issue the payment cards). Each issuer server 300 is configured to communicate with the acquirer servers 270 via the payment network 108, and maintains a secure accounts database that includes a plurality of clusters each associated with a respective financial account. Each cluster typically identifies an account number that is uniquely associated with the payment card 210, the current value of a transaction counter internal to the payment card 210, and credit/deposit entries to the associated financial account. The payment card 210 uses an algorithm or counter to generate an unpredictable transaction counter number for each financial transaction, and the issuer server 300 uses a corresponding algorithm to determine the next transaction counter number of each payment card 210.

Although the payment authorization network 100 is shown comprising only a single payment terminal 200, a single acquirer server 270 and a single issuer server 300, the payment authorization network 100 typically includes a plurality of the payment terminals 200, a plurality of the acquirer servers 270, and a plurality of the issuer servers 300.

Payment Terminal

Figure 2:
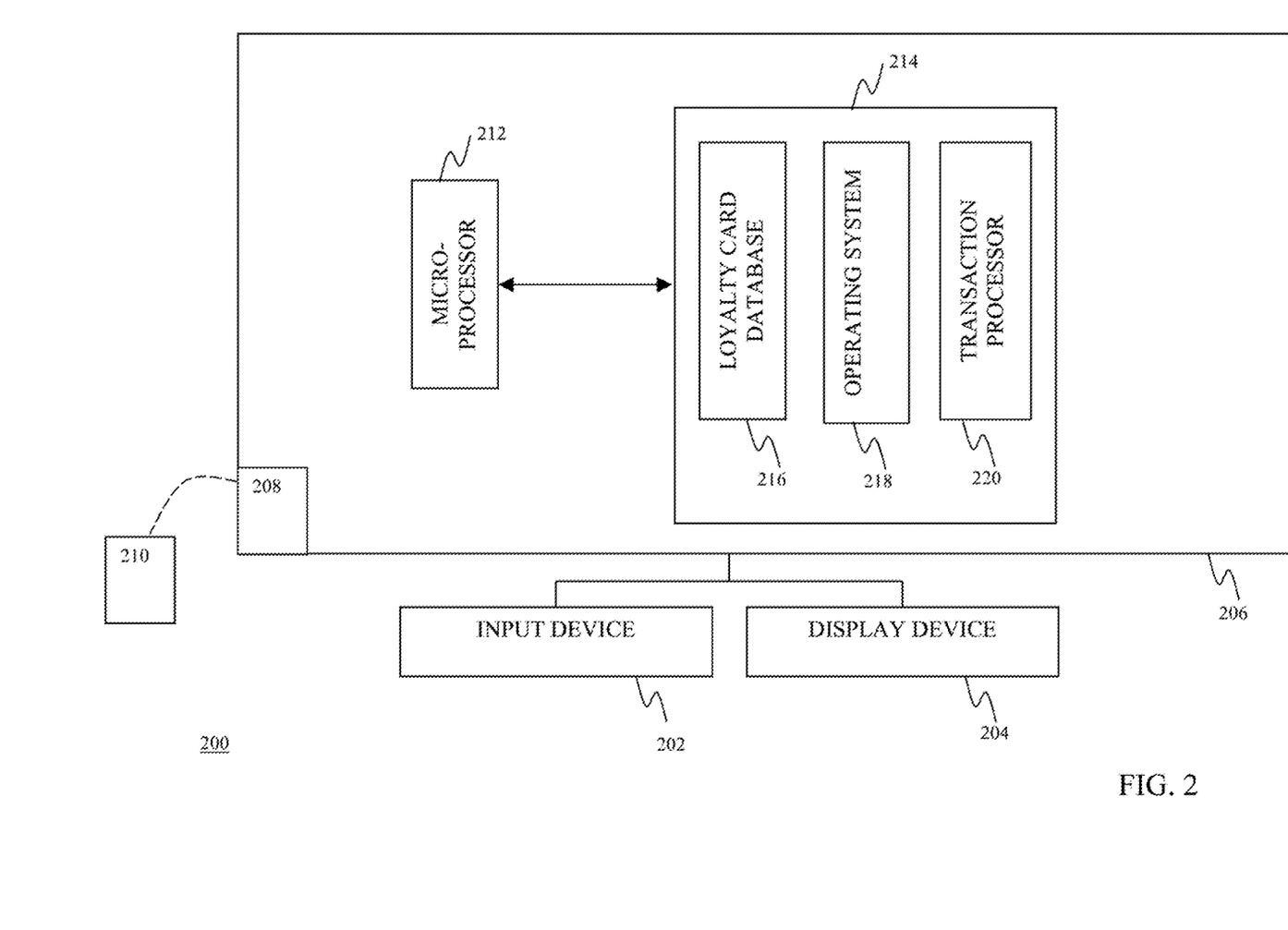
FIG. 2 is a schematic view of one of the payment terminals.

As shown in FIG. 2, the payment terminal 200 includes an input device 202, a display device 204, and a computer processing unit 206 that is coupled to the input device 202 and the display device 204. The payment terminal 200 also includes a payment card interface 208 that is coupled to the computer processing unit 206 and is configured to communicate with a payment card 210.

The input device 202 may be implemented as a keyboard, touchpad, touchscreen or other input device suitable for allowing a user of the payment terminal 200 to input data and/or commands that may be required to complete the financial transaction. The display device 204 may be implemented as a liquid crystal display (LCD) panel, cathode ray tube (CRT) display, plasma display panel, or other display device suitable for displaying transaction information to the user.

As will be discussed in greater detail below, the payment card 210 may be implemented as a plastic card that has a contact form factor and/or a contactless (e.g. ISO 14443 based) form factor. If the payment card 210 has a contact form factor, the payment card interface 208 may comprise a physical port (e.g. smartcard reader) that allows the payment terminal 200 to communicate directly with the payment card 210. If the payment card 210 has a contactless form factor, the payment card interface 208 may comprise a wireless interface that allows the payment terminal 200 to communicate with the payment card 210 via a wireless protocol, such as ISO 14443. Alternately, the payment card 210 may be implemented as software within a portable communications device, such as a smartphone, in which case the payment card interface 208 may be configured to communicate with the payment card 210 of the portable communications device using short-range communications protocols, such as Bluetooth and/or Near Field Communications (NFC) as examples.

The computer processing unit 206 includes a microprocessor 212 and a non-transient computer-readable medium 214. The non-transient computer-readable medium 214 may be provided as non-volatile electronic computer memory (e.g. FLASH memory) or optical or magnetic memory (e.g. compact disc, hard disk). The non-transient memory 214 may maintain a loyalty card database 216 of payment cards for which the merchant would like to offer discounts. Alternately, the loyalty card database 216 may be maintained on an ECR associated with each payment terminal 200, on a server (not shown) that serves the payment terminals 200 on the merchant's local area network, or on the acquirer server 270.

The merchant may issue loyalty payment cards to its customers (or authorize a payment card issuer to do so). All such loyalty payment cards may have an Issuer Identification Number (IIN) that identifies the payment card as a loyalty payment card issued by that merchant. Accordingly, preferably the loyalty card database 216 is configured with the IINs of the merchant's loyalty payment cards.

The merchant may assign the same discount rate to each loyalty payment card. Alternately, however, the merchant may have been assigned multiple ranges of IINs for its loyalty payment cards, and may prefer to assign different discount rates to different loyalty payment cards based on their respective IIN. For example, bearers of loyalty payment cards having an IIN between 'xxa' and 'xxb' may be entitled a 10% discount, and bearers of loyalty payment cards having an IIN between 'xxc' and 'xxd' may be assigned a 20% discount. Accordingly, preferably the loyalty card database 216 is configured with the respective discount rate associated with each IIN of the merchant's loyalty payment cards.

The non-transient memory 214 also includes computer processing instructions stored thereon which, when accessed from the memory 214 and executed by the microprocessor 212, implement an operating system 218 and a transaction processor 220. The operating system 218 allows the payment terminal 200 to accept user input from the input device 202 and to control the display device 204 and the payment card interface 208.

The operation of the transaction processor 220 will be discussed in greater detail below. However, it is sufficient at this point to note that the transaction processor 220 is configured to receive, from a payment card 210 that is interfaced with the payment card interface 208, application data in response to a predetermined authorization amount provided to the payment card by the payment terminal. The application data comprises an account number that is uniquely associated with the payment card 210.

The transaction processor 220 is also configured to generate an adjusted authorization amount based on the account number and from a preliminary authorization amount received at the payment terminal 200, to provide the payment card 210 with the adjusted authorization amount, to receive a cryptogram from the payment card 210 in response, and to provide notification of authorization of a financial transaction for the adjusted authorization amount in accordance with a confirmation that the cryptogram received at the payment terminal 200 from the payment card 210 was generated by the payment card 210 from the adjusted authorization amount and a cryptographic key uniquely associated with the payment card 210.

Although the transaction processor 220 is typically implemented as computer processing instructions, all or a portion of the functionality of the transaction processor 220 may be implemented instead in electronics hardware, such as a field programmable logic gate array (FPGA) or a complex programmable logic device (CPLD).

Payment Card

As discussed, the payment card 210 may have a contact form factor and/or a contactless form factor, and may be implemented as a plastic smartcard, chip card or integrated circuit card that includes a built-in micro-controller and protected memory. The micro-controller and protected memory together provide a secure self-contained computing environment for running cryptographic (e.g. data encryption standard (DES), triple-DES, advanced encryption standard (AES)) algorithms. Preferably, the plastic payment card 210 is implemented as a Europay Mastercard Visa (EMV) payment card that authenticates financial transactions with payment terminals 200 using the EMV standard. Alternately, the payment card 210 may be implemented in software executing on a portable communications device, such as a smart phone, that is configured to implement payment card requirements of the EMV standard and to authenticate financial transactions with payment terminals 200 using the EMV standard.

The payment card 210 is configured with a personal identification number (PIN), a primary account number, expiry date and may also store one or more private cryptographic keys and corresponding public digital certificates. The primary account number and private cryptographic key(s) are uniquely associated with the payment card 210. Each private cryptographic key and the public cryptographic key of the corresponding public digital certificate comprise an asymmetric cryptographic key pair. Each public digital certificate is signed by the payment card issuer. The payment card 210 may also be configured with a payment card cryptographic master key that is uniquely associated with the payment card 210, and a public digital certificate of the issuer of the payment card 210.

Where the payment card 210 is implemented as a plastic payment card, the PIN, account number, cryptographic key(s) and public certificate(s) may be stored in the protected memory of the payment card 210 prior to delivery of the payment card 210 to the intended user. Where the payment card 210 is implemented in software executing on a portable communications device, the payment card 210 may be configured with the PIN, account number, expiry date, cryptographic key(s), and public certificate(s) when the payment card 210 is installed on the portable communications device. Alternately, instead of the PIN being stored on the plastic payment card or in the software executing on a portable communications device (the "reference" PIN), the payment card 210 may be configured to generate the reference PIN, for example, from the cryptographic key(s) stored in the payment card 210.

Method of Authorizing a Financial Transaction

As discussed, the payment authorization network 100 implements a method of authorizing a financial transaction in which the authorization amount is altered at the payment terminal. A sample embodiment of the transaction authorizing method will be discussed with reference to FIGS. 3a and 3b. As will be explained, in this embodiment the payment terminal 200 receives, from the payment card 210 that is interfaced with the payment terminal 200, application data in response to a predetermined authorization amount that is provided to the payment card 210 by the payment terminal 200. The application data comprises an account number that is uniquely associated with the payment card 210.

Figure 3A:
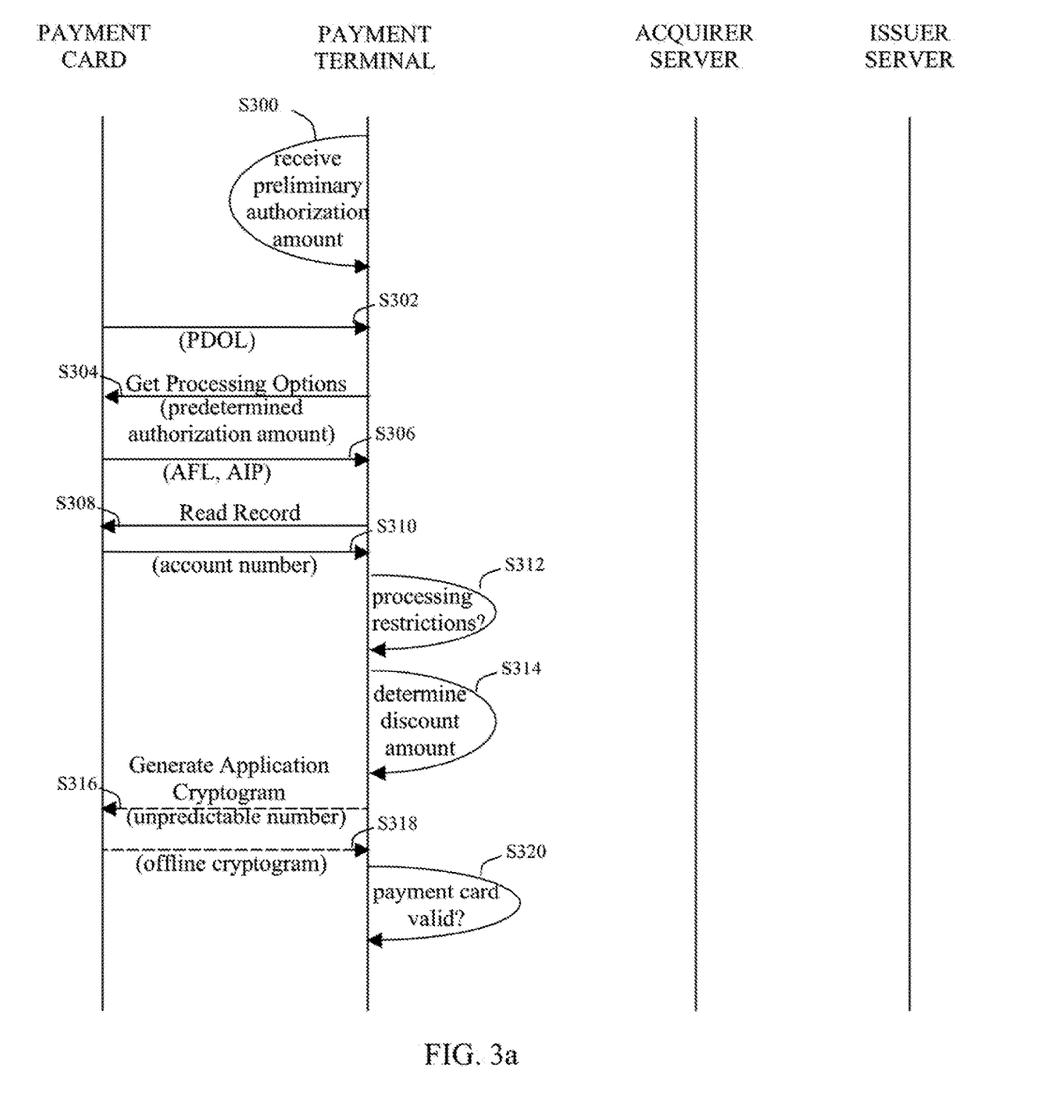
FIGS. 3a and 3b together comprise an EMV message flow diagram that depicts the method.
Figure 3B:
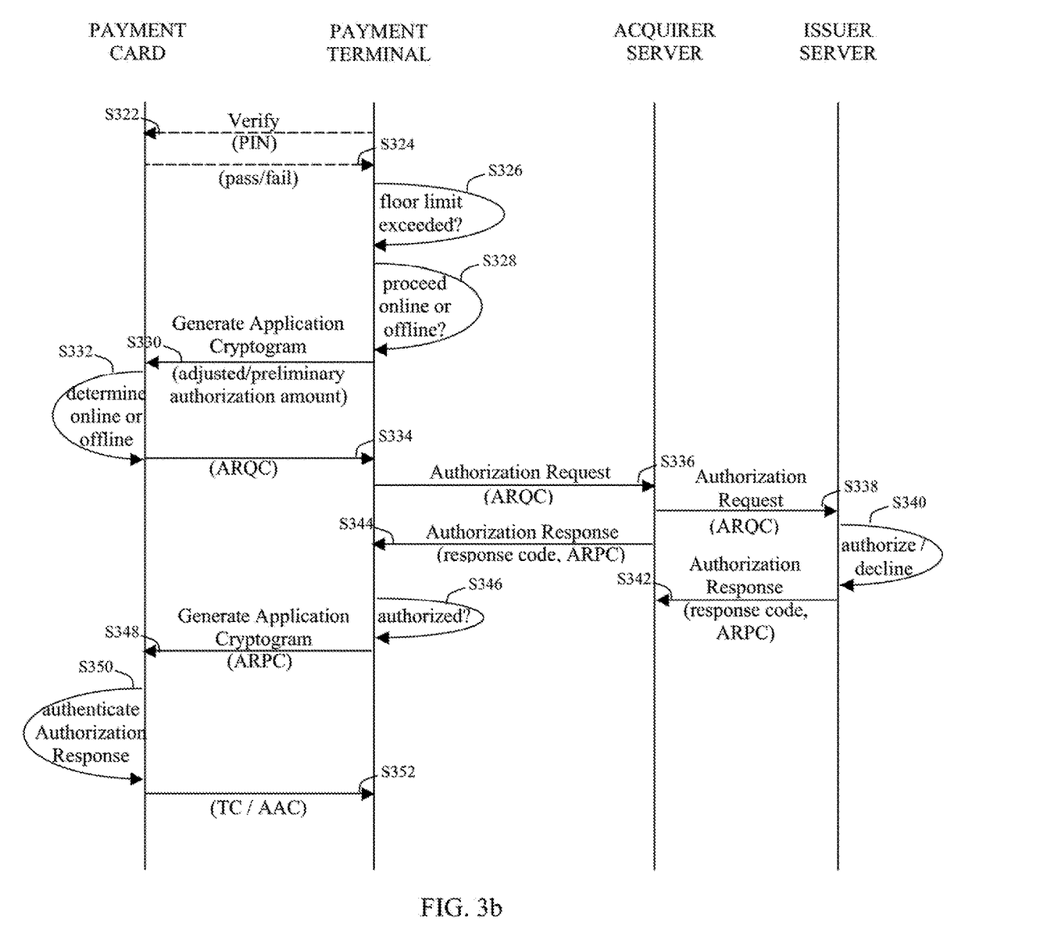

The payment terminal 200 generates an adjusted authorization amount based on the account number and from a preliminary authorization amount that is received at the payment terminal 200, provides the payment card 210 with the adjusted authorization amount, and receives a cryptogram from the payment card 210 in response. The payment terminal 200 provides notification of authorization of a financial transaction for the adjusted authorization amount in accordance with a confirmation that the cryptogram received at the payment terminal 200 from the payment card 210 was generated by the payment card 210 from the adjusted authorization amount and a private cryptographic key uniquely associated with the payment card 210.

An example transaction authorizing method will now be discussed in detail with reference to FIGS. 3a and 3b. In the following example, the payment terminal 200 is configured to implement the EMV standard (subject to the method implemented by the transaction processor 220, as discussed above), and the payment card 210 is implemented as a plastic EMV payment card or as software (executing on a portable communications device) that is configured to implement the EMV standard.

A customer attends at a payment terminal 200 of a merchant to complete a financial transaction (e.g. pay for wares and/or services) with the merchant. At step S300, the transaction particulars, including the pre-discounted total payable amount (preliminary authorization amount), are input into the payment terminal 200 directly by the merchant or indirectly via the ECR. The payment terminal 200 displays the preliminary authorization amount on the display device 204, and prompts the customer to approve the displayed authorization amount via the input device 202. The customer approves the displayed authorization amount, and the payment terminal 200 prompts the customer to interface a payment card 210 with the payment card interface 208 of the merchant's payment terminal 200.

After the customer (cardholder) interfaces a payment card 210 with the payment terminal 200, the payment card 210 provides the payment terminal 200 with a Processing Options Data List (PDOL), at step S302, that identifies the data elements that the payment card 210 will require to authorize the financial transaction.

At step S304, the transaction processor 220 of the payment terminal 200 transmits to the payment card 210 a Get Processing Options command that includes the data specified in the PDOL. Typically the PDOL lists the authorization amount as one of the required data elements. Although the payment terminal 200 was provided with the preliminary authorization amount at step S300, the cardholder might be entitled to a discount to the preliminary authorization amount based on the account number of the payment card 210. Since the actual authorization amount therefore is unknown at the stage, at step S304 the transaction processor 220 sets the authorization amount datum of the Get Processing Options command to a predetermined authorization amount. To comply with the EMV standard, preferably the predetermined authorization amount included in the Get Processing Options is hexadecimal zero.

At step S306, the payment card 210 provides the payment terminal 200 with an Application File Locator (AFL) message that identifies the location(s) in the protected memory of the payment card 210 of various data elements that the payment terminal 200 may need to authorize the financial transaction. At step S306, the payment card 210 also provides the payment terminal 200 with an Application Interchange Profile (AIP) that identifies the capabilities of the payment card 210, such as the type of offline data authentication (discussed below) that the payment card 210 supports.

Using the AFL, at step S308 the transaction processor 220 transmits to the payment card 210 a Read Record command for the various data elements required by the payment terminal 200. Typically, the Read Record command requests the account number, expiry date and software application version of the payment card 210. The Read Record command may also request a public digital certificate of the payment card 210 and optionally also a public digital certificate of the issuer of the payment card 210. The payment card 210 responds to the payment terminal 200, at step S310, with the account number and any other data requested by the Read Record command. At step S310, the payment card 210 may also provide the payment terminal 200 with a Card Risk Management Data Objects List (CDOL) that identifies the data elements that the payment card 210 may require to generate a cryptogram.

From the expiry date and application version of the software stored on the payment card 210 (as defined in the AIP), at step S312 the payment terminal 200 determines whether the payment card 210 is restricted from being used to authorize the financial transaction.

As discussed, the payment terminal 200 may be configured with a loyalty card database 216 (or may be in communication with a loyalty card database 216 that is maintained on an ECR, on a server that serves the payment terminals 200 on the merchant's local area network, or on the acquirer server 270) of account numbers for which the merchant would like to offer discounts. Accordingly, at step S314 the transaction processor 220 queries the loyalty card database 216 (whether stored internally or externally to the payment terminal 200) with the account number received from the payment card 210 to determine whether the cardholder is a preferred customer and, if so, the allowed discount (if any) to the preliminary authorization amount.

The payment terminal 200 may then validate the payment card 210 based on the type of offline data authentication, if any, identified in the AIP (received at step S306). To do so, at step S316 the transaction processor 220 may transmit to the payment card 210 a Generate Application Cryptogram command, requesting an offline cryptogram from the payment card 210.

If the AIP indicates that the payment card 210 supports Dynamic Data Authentication (DDA) or Combined Data Authentication (CDA), the transaction processor 220 generates an unpredictable number, and includes the unpredictable number in the offline cryptogram request. In response, the payment card 210 generates an offline cryptogram from the unpredictable number and a private cryptographic key of the payment card 210, and provides the payment terminal 200 with the offline cryptogram, at step S318. At step S320, the transaction processor 220 validates the payment card 210 by using the public certificate of the payment card issuer to validate the public certificate of the payment card 210 (both received in response to the Read Record command at step S310), and uses the public certificate of the payment card 210 to verify that the payment card 210 generated the offline cryptogram.

If the AIP indicates that the payment card 210 does not support DDA or CDA, but instead supports Static Data Authentication (SDA), the payment terminal 200 receives from the payment card 210 (in response to the Read Record command at step S310) signed static application data that is stored on the payment card. The transaction processor 220 validates the payment card 210, at step S320, by using the public certificate of the payment card issuer to verify that the payment card issuer signed the static application data.

The payment terminal 200 may then authenticate the bearer of the payment card 210 by prompting the customer (cardholder) to input a PIN into the payment terminal 200 via the input device 202. After the customer (cardholder) inputs a PIN into the payment terminal 200, at step S322 the transaction processor 220 transmits to the payment card 210 a Verify command that includes the PIN. The payment card 210 uses the reference PIN that is stored in the protected memory of the payment card 210 (or generates the reference PIN) to validate the PIN received from the payment terminal 200, and responds to the payment terminal 200 with a pass/fail validation message, at step S324, indicating whether validation of the PIN received from the payment terminal 200 passed or failed.

At step S326, the transaction processor 220 assesses the risk associated with the financial transaction by comparing the adjusted/preliminary authorization amount against a floor limit established by the issuer of the payment card 210.

Although the financial transaction authorizing method has been described thus far as comprising the sequence of processing restrictions (step S312), payment card validation (steps S316 to S320), cardholder authentication (steps S322 to S324) and risk management (step S326), the method is not limited to this particular sequence. The financial transaction authorizing method may be effected by implementing the processing restrictions, payment card validation, cardholder authentication and risk management stages in any order.

Based on the results of the processing restrictions, payment card validation, cardholder authentication and transaction floor limit check (collectively the Terminal Verification Results), at step S328 the transaction processor 220 determines whether the financial transaction should be approved online, approved offline, or declined offline.

If the transaction processor 220 determines, at step S328, that the financial transaction can be approved offline, at step S330 the transaction processor 220 transmits to the payment card 210 a Generate Application Cryptogram command, requesting an offline Transaction Certificate (TC) from the payment card 210. Typically, the CDOL (received from the payment card 210 at step S310) lists the authorization amount as one of the data elements required by the payment card 210 to generate a cryptogram. Therefore, if the account number of the payment card 210 correlates with one of the IIN ranges stored in the loyalty card database 216, the transaction processor 220 generates an adjusted authorization amount by discounting the preliminary authorization amount by the discount rate that is associated with the IIN range in the loyalty card database 216. The transaction processor 220 generates an unpredictable number and incorporates the adjusted authorization amount and the unpredictable number into the Generate Application Cryptogram command. Alternately, where the account number does not correlate with one of the IIN ranges stored in the loyalty card database 216, the transaction processor 220 incorporates the preliminary authorization amount and the unpredictable number into the Generate Application Cryptogram command.

At step S332, the payment card 210 determines whether the transaction can be approved offline, for example, by verifying that the number of consecutive transactions previously approved offline has not exceeded a predetermined limit.

If the payment card 210 determines, at step S332, that the transaction can be approved offline, the payment card 210 generates an offline certificate TC from a cryptographic key of the payment card 210 and from a message authentication code that is generated from the Terminal Verification Results, the adjusted/preliminary authorization amount and unpredictable number received from the payment terminal 200, the transaction date, the account number and a transaction counter internal to the payment card 210. The payment card 210 may generate the offline certificate TC by (i) generating a cryptographic session key from the payment card cryptographic master key and the transaction counter, (ii) applying the Terminal Verification Results, adjusted/preliminary authorization amount, unpredictable number, transaction date, account number and transaction counter and the session key as inputs to a cryptographic algorithm, (iii) signing the resulting offline cryptogram with a private cryptographic key of the payment card 210, and (iv) incorporating the offline cryptogram into the offline certificate TC. Since the cryptographic session key is generated from the payment card cryptographic master key and the transaction counter, the cryptographic session key is uniquely associated with the payment card 210.

The payment card 210 responds to the payment terminal 200 with the offline certificate TC, at step S352. The payment terminal 200 uses the public certificate of the payment card 210 to confirm that the payment card 210 generated the offline cryptogram (and the offline certificate TC) from the adjusted/preliminary authorization amount and therefore that the payment card 210 authorized the transaction. The payment terminal 200 then provides a notification, on the display device 204, advising the customer that the financial transaction was authorized.

If the transaction processor 220 determines, at step S328, that the financial transaction should be approved online, at step S330 the transaction processor 220 transmits to the payment card 210 a Generate Application Cryptogram command, requesting an online cryptogram from the payment card 210. The transaction processor 220 generates an unpredictable number and incorporates the adjusted/preliminary authorization amount and the unpredictable number into the Generate Application Cryptogram command.

Upon receipt of the online cryptogram request (or if the transaction processor 220 requested an offline certificate TC at step S330, but the payment card 210 determined, at step S332, that the transaction should not be approved offline), the payment card 210 generates an online Application Request Cryptogram (ARQC) from a cryptographic key of the payment card 210 and from a message authentication code that is generated from the Terminal Verification Results, the adjusted/preliminary authorization amount and unpredictable number received from the payment terminal 200, the transaction date, the account number and the payment card internal transaction counter. The payment card 210 may generate the online cryptogram ARQC by (i) generating a cryptographic session key from the payment card cryptographic master key and the transaction counter, and (ii) applying the Terminal Verification Results, adjusted/preliminary authorization amount, unpredictable number, transaction date, account number and transaction counter (collectively the Issuer Authorization Data) and the session key as inputs to a cryptographic algorithm.

Since the cryptographic session key is generated from the payment card cryptographic master key and the transaction counter, the cryptographic session key is uniquely associated with the payment card 210. The payment card 210 responds to the payment terminal 200 with the online cryptogram ARQC, at step S334.

At step S336, the transaction processor 220 generates an Authorization Request Message that includes the Issuer Authorization Data and the online cryptogram ARQC, and forwards the Authorization Request Message to the acquirer server 270 via the acquirer network 106. At step S338, the acquirer server 270 directs the Authorization Request Message to the issuer server 300, over the payment network 108, for validation.

At step S340, the issuer server 300 verifies that the payment card 210 generated the online cryptogram ARQC. To do so, the issuer server 300 may (i) recover the payment card's session key by applying the account number, payment card internal transaction counter and a card issuer cryptographic master key as inputs to a suitable cryptographic algorithm, (ii) decrypt the online cryptogram ARQC with the recovered session key, (iii) compute a message authentication code from the Issuer Authorization Data, and (iv) compare the computed message authentication code against the decrypted cryptogram.

At step S340, the issuer server 300 also applies its prevailing risk management rules to the adjusted/preliminary authorization amount. Therefore, for example, the issuer server 300 may determine whether the financial account that is associated with the account number is still active and has sufficient credit/funds to complete the transaction (i.e. the adjusted/preliminary authorization amount is less than the credit/funds balance for the account). The issuer server 300 may also determine whether the transaction is consistent with the cardholder's history of transactions.

The issuer server 300 generates an authorization response code that indicates the outcome of the risk management analysis and the online cryptogram ARQC verification (i.e. whether the issuer approved or declined the transaction and whether the payment card 210 generated the online cryptogram ARQC from the adjusted/preliminary authorization amount and the cryptographic master key (session key) of the payment card 210), and generates an Application Response Cryptogram (ARPC) from a cryptographic key of the payment card 210 and from a message authentication code that is generated from the account number, authorization response code and online cryptogram ARQC. The issuer server 300 may generate the cryptogram ARPC by applying the authorization response code, online cryptogram ARQC and session key (recovered from the account number and the card issuer cryptographic master key) as inputs to a suitable cryptographic algorithm.

At step S342, the issuer server 300 generates an Authorization Response Message that includes the Issuer Authorization Data, authorization response code and cryptogram ARPC, and directs the Authorization Response Message to the acquirer server 270 via the payment network 108. At step S344, the acquirer server 270 forwards the Authorization Response Message to the payment terminal 200, via the acquirer network 106.

At step S346, the payment terminal 200 examines the authorization response code of the Authorization Response Message. If the authorization response code indicates that the card issuer authorized the transaction and that the payment card 210 generated the online cryptogram ARQC from the adjusted/preliminary authorization amount and the cryptographic master key (or session key) of the payment card 210, at step S348 the transaction processor 220 transmits to the payment card 210 a Generate Application Cryptogram command, requesting from the payment card 210 a Transaction Certificate (TC) confirming that the issuer server 300 generated the Authorization Response Message. The transaction processor 220 generates an unpredictable number and incorporates the Issuer Authorization Data and unpredictable number, authorization response code and cryptogram ARPC into the Generate Application Cryptogram command.

At step S350, the payment card 210 then determines whether the issuer server 300 generated the cryptogram ARPC. To do so, the payment card 210 may (i) decrypt the cryptogram ARPC with the payment card's session key, (ii) compute a message authentication code from the account number, authorization response code and online cryptogram ARQC, and (iii) compare the computed message authentication code against the decrypted cryptogram.

If the payment card 210 confirms that the issuer server 300 generated the cryptogram ARPC and therefore that the card issuer authorized the transaction, the payment card 210 generates the certificate TC from a cryptographic key of the payment card 210 and from a message authentication code that is generated from the Terminal Verification Results, the adjusted/preliminary authorization amount and unpredictable number received from the payment terminal 200, the transaction date, the account number and the internal transaction counter. The payment card 210 may generate the certificate TC by (i) generating a session key from the payment card cryptographic master key and the transaction counter, (ii) applying the Terminal Verification Results, adjusted/preliminary authorization amount, unpredictable number, transaction date, account number and transaction counter and the session key as inputs to a cryptographic algorithm, (iii) signing the resulting cryptogram with a private cryptographic key of the payment card 210, and (iv) incorporating the cryptogram into the certificate TC. Since the cryptographic session key is generated from the payment card cryptographic master key and the transaction counter, the cryptographic session key is uniquely associated with the payment card 210.

The payment card 210 responds to the payment terminal 200 with the certificate TC, at step S352. The payment terminal 200 uses the public certificate of the payment card 210 to confirm that the payment card 210 generated the cryptogram (and the certificate TC) from the adjusted/preliminary authorization amount and therefore that the issuer server 300 authorized the transaction. The payment terminal 200 then provides a notification, on the display device 204, advising the customer that the financial transaction was authorized.

If the authorization response code indicates that the card issuer declined the transaction (or if, at step S328, the transaction processor 220 determined that the transaction should be declined offline), at step S348 the transaction processor 220 transmits to the payment card 210 a Generate Application Cryptogram command, requesting from the payment card 210 an Application Authentication Cryptogram (AAC) confirming that the issuer server 300 generated the Authorization Response Message. The transaction processor 220 generates an unpredictable number and incorporates the Issuer Authorization Data and unpredictable number into the Generate Application Cryptogram command.

The payment card 210 generates the cryptogram AAC from a cryptographic key of the payment card 210 and from a message authentication code that is generated from the Terminal Verification Results, the adjusted/preliminary authorization amount and unpredictable number received from the payment terminal 200, the transaction date, the account number and the internal transaction counter. The payment card 210 may sign the resulting cryptogram with a private cryptographic key of the payment card 210.

The payment card 210 responds to the payment terminal 200 with the cryptogram AAC, at step S352. The payment terminal 200 uses the public certificate of the payment card 210 to confirm that the payment card 210 generated the cryptogram AAC from the adjusted/preliminary authorization amount and therefore that the payment card 210 or the issuer server 300 declined the transaction. The payment terminal 200 then provides a notification, on the display device 204, advising the customer that the financial transaction was declined.

As will be apparent, therefore, based on the type of cryptogram received at the payment terminal 200, the payment terminal 200 provides a notification advising whether the financial transaction was authorized or declined. Since the payment terminal 200 generates the adjusted authorization amount based on the account number associated with the payment card 210, and the payment card 210 generates the online or offline cryptogram from the adjusted authorization amount, the merchant can offer preferred customers adjustments to the preliminary authorization amount without requiring re-configuration of the payment card 210 or the card issuer server 300.

The invention claimed is:

1. A payment terminal comprising:
a card interface;
a memory storing processing instructions; and
a transaction processor coupled to the card interface and the memory, wherein the processing instructions cause the transaction processor to:
receive a preliminary authorization amount;
provide user notification of the preliminary authorization amount and receive user authorization of the preliminary authorization amount;
receive application data from a payment card interfaced with the card interface, the application data comprising an account number uniquely associated with the payment card;
generate an adjusted authorization amount from the account number and the preliminary authorization amount, the adjusted authorization amount being different from the preliminary authorization amount;
determine whether the adjusted authorization amount can be authorized offline, and transmit a cryptogram request to the payment card via the card interface without user authorization of the adjusted authorization amount, the cryptogram request including the adjusted authorization amount;
receive a cryptogram from the payment card via the card interface and receive an authorization response message confirming authorization of the adjusted authorization amount; and
confirm that the cryptogram was generated from the adjusted authorization amount and from a cryptographic key uniquely associated with the payment card.

2. The payment terminal according to claim 1, wherein the processing instructions cause the transaction processor to determine that the adjusted authorization amount can be authorized offline, and to receive the cryptogram and the authorization response message from the payment card.

3. The payment terminal according to claim 1, wherein the processing instructions cause the transaction processor to determine that the adjusted authorization amount cannot be authorized offline, transmit an authorization request message to an issuer server, and receive the authorization response message from the issuer server in response to the authorization request message, the authorization request message including the cryptogram and the adjusted authorization amount.

4. The payment terminal according to claim 1, wherein the processing instructions cause the transaction processor to receive confirmation from the payment card that the adjusted authorization amount cannot be authorized offline, transmit an authorization request message to an issuer server, and receive the authorization response message from the issuer server in response to the authorization request message, the authorization request message including the cryptogram and the adjusted authorization amount.

5. The payment terminal according to claim 1, wherein the payment terminal is configured with a range of issuer identification numbers, and the processing instructions cause the transaction processor to generate the adjusted authorization amount from a correlation between the account number and the range of issuer identification numbers.

6. The payment terminal according to claim 1, wherein the processing instructions cause the transaction processor to determine whether the adjusted authorization amount can be authorized offline by validating the payment card and a bearer of the payment card.

7. The payment terminal according to claim 1, wherein the processing instructions cause the transaction processor to transmit a predetermined authorization amount to the payment card after receiving the preliminary authorization amount and prior to receiving the application data, the predetermined authorization amount being different from the preliminary authorization amount.

8. A method of altering an authorization amount comprising:
a payment terminal receiving a preliminary authorization amount;
the payment terminal providing user notification of the preliminary authorization amount and receive user authorization of the preliminary authorization amount;
the payment terminal receiving application data from a payment card interfaced with the payment terminal, the application data comprising an account number uniquely associated with the payment card;
the payment terminal generating an adjusted authorization amount from the account number and the preliminary authorization amount, the adjusted authorization amount being different from the preliminary authorization amount;
the payment terminal determining whether the adjusted authorization amount can be authorized offline, and transmitting a cryptogram request to the payment card without user authorization of the adjusted authorization amount, the cryptogram request including the adjusted authorization amount;
the payment card generating a cryptogram and transmitting the cryptogram to the payment terminal;
the payment terminal receiving the cryptogram and receiving an authorization response message confirming authorization of the adjusted authorization amount; and
the payment terminal confirming that the cryptogram was generated from the adjusted authorization amount and from a cryptographic key uniquely associated with the payment card.

9. The method according to claim 8, wherein the determining whether the adjusted authorization amount can be authorized offline comprises the payment terminal determining that the adjusted authorization amount can be authorized offline, the generating a cryptogram comprises the payment card authorizing the adjusted authorization amount offline, and the transmitting the cryptogram comprises the payment card transmitting the cryptogram and the authorization response message to the payment terminal.

10. The method according to claim 8, wherein the determining whether the adjusted authorization amount can be authorized offline comprises the payment terminal determining that the adjusted authorization amount cannot be authorized offline, and the receiving an authorization response message comprises the payment terminal transmitting an authorization request message to an issuer server and receiving the authorization response message from the issuer server in response to the authorization request message, the authorization request message including the cryptogram and the adjusted authorization amount.

11. The method according to claim 8, wherein the generating a cryptogram comprises the payment card determining that the adjusted authorization amount cannot be authorized offline, and the receiving an authorization response message comprises the payment terminal transmitting an authorization request message to an issuer server and receiving the authorization response message from the issuer server in response to the authorization request message, the authorization request message including the cryptogram and the adjusted authorization amount.

12. The method according to claim 8, wherein the payment terminal is configured with a range of issuer identification numbers, and the generating an adjusted authorization amount comprises the payment terminal generating the adjusted authorization amount from a correlation between the account number and the range of issuer identification numbers.

13. The method according to claim 8, wherein the determining whether the adjusted authorization amount can be authorized offline comprises the payment terminal validating the payment card and a bearer of the payment card.

14. The method according to claim 8, wherein the receiving the application data comprises the payment terminal transmitting a predetermined authorization amount to the payment card and receiving the application data from the payment card in response to the transmitting a predetermined authorization amount, the predetermined authorization amount being different from the preliminary authorization amount.

15. A non-transitory computer-readable medium storing computer processing instructions thereon for execution by a payment terminal, the computer processing instructions, when executed by the payment terminal, causing the payment terminal to:
receive a preliminary authorization amount;
provide user notification of the preliminary authorization amount and receive user authorization of the preliminary authorization amount;
receive application data from a payment card interfaced with the payment terminal, the application data comprising an account number uniquely associated with the payment card;
generate an adjusted authorization amount from the account number and the preliminary authorization amount, the adjusted authorization amount being different from the preliminary authorization amount;
determine whether the adjusted authorization amount can be authorized offline, and transmit a cryptogram request to the payment card without user authorization of the adjusted authorization amount, the cryptogram request including the adjusted authorization amount;
receive a cryptogram from the payment card and receive an authorization response message confirming authorization of the adjusted authorization amount; and
confirm that the cryptogram was generated from the adjusted authorization amount and from a cryptographic key uniquely associated with the payment card.

16. The computer-readable medium according to claim 15, wherein the processing instructions cause the payment terminal to determine that the adjusted authorization amount can be authorized offline, and to receive the cryptogram and the authorization response message from the payment card.

17. The computer-readable medium according to claim 15, wherein the processing instructions cause the payment terminal to determine that the adjusted authorization amount cannot be authorized offline, transmit an authorization request message to an issuer server, and receive the authorization response message from the issuer server in response to the authorization request message, the authorization request message including the cryptogram and the adjusted authorization amount.

18. The computer-readable medium according to claim 15, wherein the processing instructions cause the payment terminal to receive confirmation from the payment card that the adjusted authorization amount cannot be authorized offline, transmit an authorization request message to an issuer server, and receive the authorization response message from the issuer server in response to the authorization request message, the authorization request message including the cryptogram and the adjusted authorization amount.

19. The computer-readable medium according to claim 15, including a range of issuer identification numbers, and the processing instructions cause the payment terminal to generate the adjusted authorization amount from a correlation between the account number and the range of issuer identification numbers.

20. The computer-readable medium according to claim 15, wherein the processing instructions cause the payment terminal to transmit a predetermined authorization amount to the payment card after receiving the preliminary authorization amount and prior to receiving the application data, the predetermined authorization amount being different from the preliminary authorization amount.

\* \* \* \* \*